United States Patent
Aoyama et al.

[11] Patent Number: 5,337,337
[45] Date of Patent: Aug. 9, 1994

[54] FUEL ASSEMBLY

[75] Inventors: Motoo Aoyama, Mito; Ryoji Masumi, Hitachi; Yooko Ishibashi, Hitachiota; Kunitoshi Kurihara, Katsuta, all of Japan

[73] Assignee: Hitachi, Ltd., Tokyo, Japan

[21] Appl. No.: 857,263

[22] Filed: Mar. 25, 1992

[30] Foreign Application Priority Data

Mar. 29, 1991 [JP] Japan .................. 3-066006

[51] Int. Cl.$^5$ .................................................. G21C 3/32
[52] U.S. Cl. ........................................ 376/435; 376/419
[58] Field of Search ................ 376/419, 428, 435, 444

[56] References Cited

U.S. PATENT DOCUMENTS

| | | | |
|---|---|---|---|
| 3,427,222 | 2/1969 | Biancheria et al. | 376/419 |
| 3,501,411 | 3/1970 | Triggiani et al. | 376/419 |
| 3,849,248 | 11/1974 | Channon et al. | 376/419 |
| 4,229,258 | 10/1980 | Takeda et al. | 376/419 |
| 4,683,113 | 7/1987 | Mochida et al. | 376/419 |
| 5,008,070 | 4/1991 | Aoyama et al. | 376/419 |

FOREIGN PATENT DOCUMENTS

| | | |
|---|---|---|
| 57-196189 | 12/1982 | Japan . |
| 59-221695 | 12/1984 | Japan ................... 376/419 |
| 62-32386 | 2/1987 | Japan . |
| 2-77688 | 3/1990 | Japan . |

OTHER PUBLICATIONS

Keisurio (Light Water Reactor), Akiyama, pp. 56-61, Nov. 6, 1988.

*Primary Examiner*—Daniel D. Wasil
*Attorney, Agent, or Firm*—Antonelli, Terry, Stout & Kraus

[57] ABSTRACT

A fuel assembly comprising a plurality of fuel rods, where fuel rods containing a burnable poison element having a smaller neutron absorption cross-section such as boron are provided in a region of soft neutron energy spectrum and a large thermal neutron flux and fuel rods containing a burnable poison element having a larger neutron absorption cross-section such as gadolinium and fuel rods containing no such burnable poison element are provided in other region of average neutron energy spectrum, has a flat fuel rod power distribution throughout the fuel lifetime even against substantially uniform uranium enrichment distribution with reduced parasitic neutron absorption by gadolia, that is, with higher burnup and reduced fuel cycle cost.

6 Claims, 4 Drawing Sheets

NUMERICAL VALUE SHOWS 2200 M/S CROSS-SECTION (RESONANCE INTEGRAL)

FUEL ASSEMBLY

BACKGROUND OF THE INVENTION

The present invention relates to a fuel assembly and more particularly to a fuel assembly suitable for application to a water cooling-type nuclear reactor, which can be attain a higher burnup, improve fuel economy and contribute to a desired thermal allowance.

A fuel assembly for a boiling water-type nuclear reactor generally comprises bundles of fuel rods each comprising a cladding and fuel pellets containing a fissile material, filled in the cladding, and a channel box having a square cross-section, which covers the fuel rods, as disclosed by a book "Light water reactor" written by Mamoru Akiyama and published by Dobun Shoin Publishing Co., Tokyo, Japan. Reactor core is charged with a plurality of the fuel assemblies. As fuel material, enriched uranium or mixed material of plutonium and uranium is used in an oxide form.

The reactivity of reactor core decreases with burning of the fissile material contained in the fuel material, and thus more fissile material than the critical mass is charged in the reactor core in the initial period of an operation cycle of a nuclear reactor so as to keep the nuclear reactor in a critical state even at the final stage of the operating cycle. The resulting excess reactivity is controlled by inserting a control rod of cross type cross-section containing boron carbide or hafnium between a plurality of the adjacent fuel assemblies and adding a burnable poison such as gadolinia, etc. to the fuel material, thereby adjusting the neutron absorption.

Recently, higher burnup is keenly desired from the viewpoint of prolongation of continuous operation period of a nuclear reactor and reduction in generation of spent fuel assemblies. In order to attain the higher burnup, it is necessary to increase the fuel enrichment, but the excess reactivity is inevitably increased thereby.

In the assemblies of the prior art, gadolinia (oxide of gadolinium) is used as a burnable poison. Gadolinium is characterized in that the excess reactivity can be controlled with a small amount of added gadolinium, because the thermal neutron absorption cross-section of odd nuclei ($^{155}Gd$ and $^{157}Gd$) is considerably large, as shown in FIG. 3. However, gadolinium has a (n, $\gamma$) nuclear reaction chain and a large resonance integrate of converted even nuclei ($^{156}Gd$ and $^{158}Gd$) (see FIG. 3), and thus is a cause for neutron parasitic absorption. That is, when the excess reactivity increased by higher burnup is controlled only by gadolinia (strong neutron-absorbing substance), the reactivity of the reactor core is decreased by about 2% $\Delta k/kk'$ due to the neutron parasitic absorption by gadolinia. Thus, it is necessary to charge the fissile material in excess correspondingly, and the fuel economy is deteriorated (first problem).

Furthermore, addition of gadolinia reduces the heat conductivity of pellets, and thus the enrichment of fissile material ($^{235}U$, etc.) in gadolinia-containing fuel rods is made lower than the maximum enrichment in a fuel assembly from the viewpoint of maintaining the soundness of fuel rods, thereby suppressing the power after burning-out of gadolinia. However, when the applicable uranium enrichment is limited, the average enrichment of a fuel assembly will be lower than the maximum uranium enrichment, and a higher burnup cannot be obtained (second problem).

FIG. 2 shows distribution of thermal neutron flux in the horizontal cross-sectional direction of a fuel assembly, where there is a difference in the thermal neutron flux at least by twice between the fuel rods at the respective corners of a channel box with softest neutron spectrum and the fuel rods at the second and third positions from the respective corners with hardest neutron spectrum. Such a structure gives excessively a large power from the fuel rods positioned in the peripheral region of a fuel assembly having a high thermal neutron flux, and thus the fuel rod power distribution in the fuel assembly is flattered by making the enrichment of fissile material ($^{235}$uranium, etc.) in the peripheral region than that of the center region. However, when the applicable uranium enrichment is limited even in that case, an average enrichment of a fuel assembly will be lower than the maximum uranium enrichment and no higher burnup can be obtained (third problem).

Technique of adding gadolinia to the fuel rods positioned in the peripheral region of a fuel assembly to flatten the fuel rod power distribution is disclosed in Japanese Patent Application Kokai (Laid-open) No. 62-32386. Even if the fuel rod power distribution could be flattened at the initial period of lifetime of the fuel assembly, the power of gadolinia-containing fuel rods will be increased with the progress of gadolinia burning, because gadolinia has a large thermal neutron absorption cross-section. Thus, it is difficult to flatten the fuel rod power distribution throughout the lifetime of a fuel assembly, and the above-mentioned problems 1 and 3 can never be solved thereby.

Technique of adding boron, a weak burnable absorber, to the fuel rods in the peripheral region of a fuel assembly to solve the above-mentioned problem 3 is disclosed in Japanese Patent Application Kokai (Laid-open) No. 57-196189. However, when the excess reactivity is controlled only with $^{10}B$ having a thermal neutron absorption cross-section by about 1/100 smaller than that of $^{157}Gd$, a large number of fuel rods must be such burnable absorber-containing fuel rods. When all the fuel rods positioned in the peripheral region of a fuel assembly are such burnable absorber-containing fuel rods, the control rod worth will be decreased, if the fuel assembly is to be used in boiling water-type nuclear reactors.

Technique of adding boron to the peripheral region of a fuel pellet and gadolinia to the center region to solve the above-mentioned problems 1 and 2 is disclosed in Japanese Patent Application Kokai (Laid-open) No. 57-196189. In that case the number of burnable absorber-containing fuel rods can be reduced, but the problem 3 is not solved.

SUMMARY OF THE INVENTION

An object of the present invention is to solve the above-mentioned problems 1, 2 and 3 and provide a fuel assembly suitable for higher burnup.

Another object of the present invention is to provide a nuclear reactor core suitable for an increase in the availability factor and the lifetime of nuclear fuel, using the present fuel assemblies.

According to the present fuel assembly, a plurality of burnable absorbers having different neutron absorption cross-section are used. That is, burnable poison elements having a relatively small neutron absorption cross-section such as boron, etc. are more provided, in regions having a relatively large ratio by volume of moderator to fuel, a soft neutron energy spectrum and a large thermal neutron flux such as the peripheral region and the lower level region of a fuel assembly than in other regions, i.e. regions having an average neutron energy spectrum, and burnable poison elements having a relatively large neutron absorption cross-section such as gadolinium, etc. is more provided in regions having an average neutron energy spectrum than in other regions, i.e. regions having a soft neutron energy spectrum. The plurality of these burnable absorbers are added to fuel rods separately according to the difference in the neutron absorption cross-section. It is also possible to add the plurality of these burnable absorbers into the upper level section and the lower level section of one fuel rod discretely.

The present nuclear reactor core is charged by at least one of the above-mentioned fuel assemblies.

The present fuel assembly functions as follows in contrast to the conventional fuel assembly using only one kind of burnable poison element.

From the viewpoint of reactivity and power distribution, the weak absorber must have a concentration capable of burning for a period equal to that of the strong absorber. In order to make the fuel rod power after the burning of the weak absorber equal to the conventional one, it is not preferable to excessively suppress the power in the initial period of burning (0 GWd/t). Characteristics of boron as a weak absorber is a smaller self-shielding effect than that of gadolinia and the reactivity control can be changed only by adjusting its concentration. On the basis of the above-mentioned characteristics, burnable poison elements having a relatively small neutron absorption cross-section such as boron, etc. are provided in fuel rods in the fuel assembly peripheral regions having a relatively large ratio by volume of moderator to fuel and a large thermal neutron flux. Furthermore, the thermal neutron can be properly absorbed by setting the boron concentration to an appropriate value, and the thermal neutron flux distribution and the fuel rod power distribution can be flattened even if the fissile material enrichment distribution of fuel is kept uniform. On the other hand, control of excess reactivity can be made mainly by burning the burnable poison elements having a relatively large neutron absorption cross-section provided in the center region of the fuel assembly.

In the fuel assembly having the above-mentioned structure, part of excess reactivity and local power peaking can be controlled by boron, and thus the amount of gadolinia to be added (i.e. number of fuel rods which gadolinia is to be added to and total amount of gadolia to be added) can be reduced to increase the reactivity. Even in case that the uranium enrichment is limited, higher burnup can be obtained.

DESCRIPTION OF THE PREFERRED EMBODIMENTS

The present invention will be explained in detail below, referring to embodiments.

Figure 1:
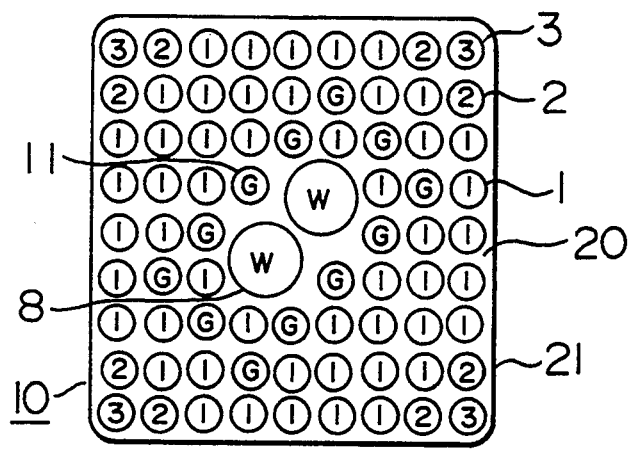
FIG. 1 is a horizontal cross-sectional view of a fuel assembly according to one embodiment of the present invention.
Figure 2:
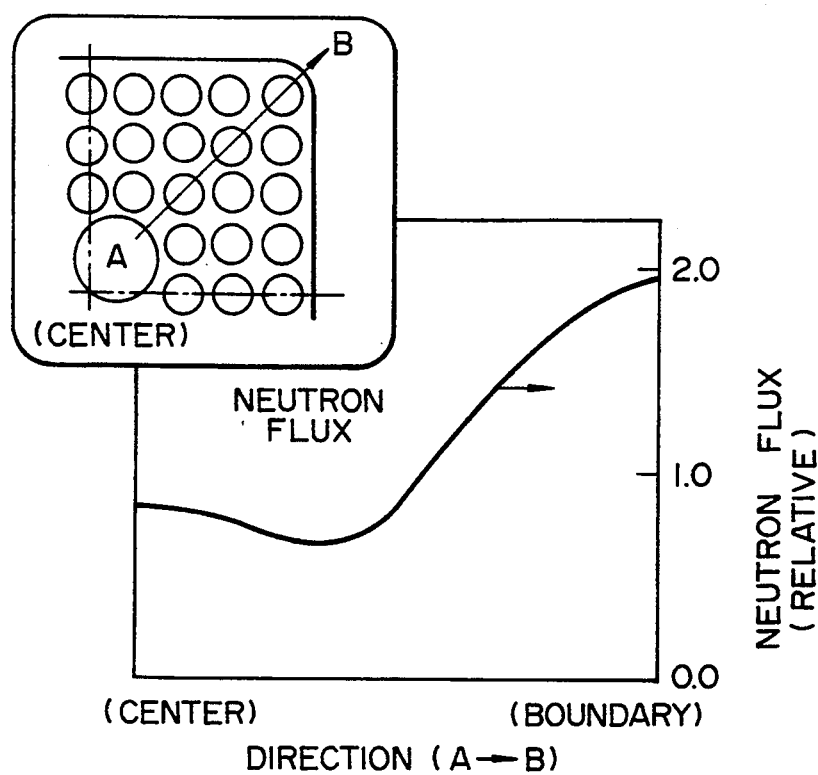
FIG. 2 is a characteristic diagram showing thermal neutron flux distribution.
Figure 3:
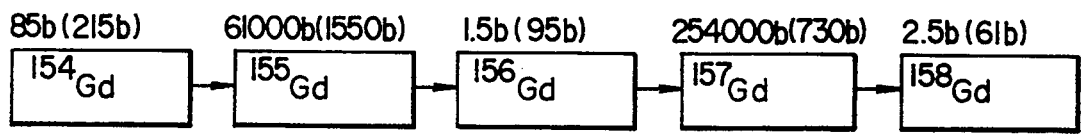
FIG. 3 is a diagram showing changes in absorption cross-section of gadolinia.

In FIG. 1, a fuel assembly according to a first embodiment of the present invention, when applied to a boiling water-type nuclear reactor, is shown. A fuel assembly 10 comprises an assembly of fuel rods 1 to 3 each comprising a zircaloy cladding 20 and a fuel material of enriched uranium oxide filled therein, and a zircalory channel box 21 of square cross-section which encases the fuel rods. Fuel rods 1 and 2 have a uranium enrichment of 4.9 wt .%, and fuel rods 3 have a uranium enrichment of 4.0 wt. %. Fuel rods 2 and 3 contain about 0.04 wt. % of natural boron, and are provided at the corners in the outermost peripheral region of the fuel assembly. Twelve fuel rods 11 containing gadolinia have a uranium enrichment of 4.4 wt. % and a gadolinia concentration of about 4.5 wt %. According to the first embodiment, fuel rods 2 and 3 containing burnable poison elements having a relatively small neutron absorption cross-section such as boron, etc. are provided in the region having a soft neutron energy spectrum and a large neutron flux such as the outermost peripheral region of the fuel assembly, and fuel rods 11 containing burnable poison elements having a relatively large neutron absorption cross-section such as gadolium, etc. and fuel rods 1 containing no such burnable poisons are provided in other regions having an average neutron energy spectrum. Numeral 8 indicates a water rod.

Figure 4:
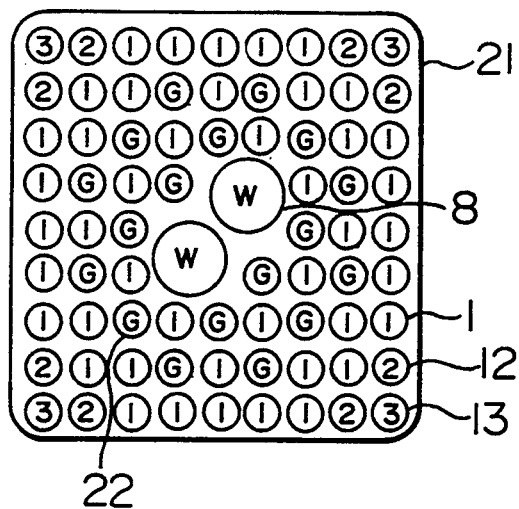
FIG. 4 is a horizontal cross-sectional view of a conventional fuel assembly.

The effect of the first embodiment will be given below in contrast to a conventional fuel assembly shown in FIG. 4 on the basis of the enrichment distribution of the conventional fuel assembly (which will be hereinafter referred to as prior art example). In the prior art example, fuel rods 1 have an uranium enrichment of 4.9 wt. %, fuel rods 12 have a uranium enrichment of 4.4 wt. % and fuel rods 13 have a uranium enrichment of 3.4 wt. %. Eighteen fuel rods 22 containing gadolinia have a uranium concentration of 4.4 wt. % and a gadolinia concentration of about 4.5 wt. %.

Figure 5:
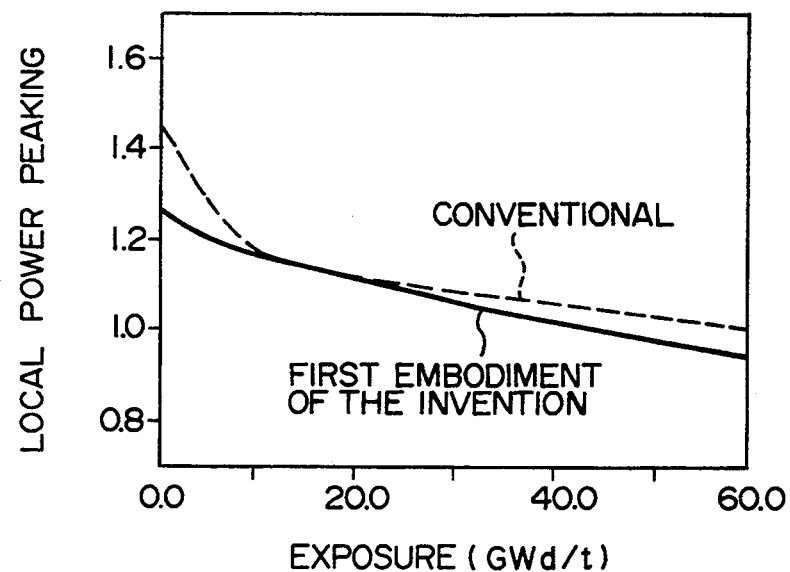
FIG. 5 is a burning characteristic diagram of local power peaking of a fuel assembly showing the effect of the embodiment of FIG. 1.

In FIG. 5 changes in the local power peaking with burnup of the first embodiment is shown in contrast to the fuel assembly of the prior art example, where the power distribution is flattened by making the uranium enrichment distribution lower toward the peripheral side of the fuel assembly.

In the fuel assembly of the first embodiment, burning rate is made gentler by adding boron to the fuel rods in the outermost peripheral region of the fuel assembly, and the power can be reduced throughout the fuel lifetime. Boron has a neutron absorption ratio smaller by about 1/100 than that of gadolinium, and thus the boron burning rate is gentler. That is, even if boron is burnt out at the final stage of operation cycle, the power of fuel rods is not considerably increased in contrast to gadolinium. Particularly by providing fuel rods containing boron in the outermost peripheral region of a fuel assembly having a large neutron flux, no unburnt boron remains even if the enrichment of fuel rods at the corners as in the first embodiment is made higher than that of fuel rods of the prior art example (FIG. 4), and the neutron flux in the outermost peripheral region can be suppressed. Even if the boron is burnt out, the increasing degree of the neutron flux in the outermost peripheral region is small. Thus, in the first embodiment, the power can be flattened as in the case of providing a uranium enrichment distribution as in the prior art example. When boron is added to the fuel rods provided in the center region in the horizontal cross-section of a fuel assembly to control the excess reactivity, boron remains unburned at the final stage of operation cycle due to the small neutron flux in the center region. It is preferable to add gadolinium having a higher burning rate to the fuel rods provided in the center region in the horizontal cross-section of a fuel assembly. When a case of adding boron to the fuel rods provided in the outermost peripheral region excluding the corners is compared with a case of adding boron to the fuel rods provided in the outermost peripheral region including the corners, the enrichment of the latter fuel rods can be made higher than that of the former, because the fuel rods provided at the corners have the lowest enrichment. The latter (the case of adding boron to the fuel rods provided in the outmost peripheral region including corners) can have a higher average enrichment of a fuel assembly than the foyer (the case of adding boron to the fuel rods provided in the outermost peripheral region excluding corners), if the maximum enrichment of the latter fuel assembly is equal to that of the former. In the case of the latter, a difference between the maximum enrichment and the minimum one in a fuel assembly can be made much smaller. Even if there is an upper limit to the applicable enrichment (for example, even if the upper limit of the enrichment is 5.0 wt. %), the smaller difference leads to a higher burnup within the limit.

Figure 6:
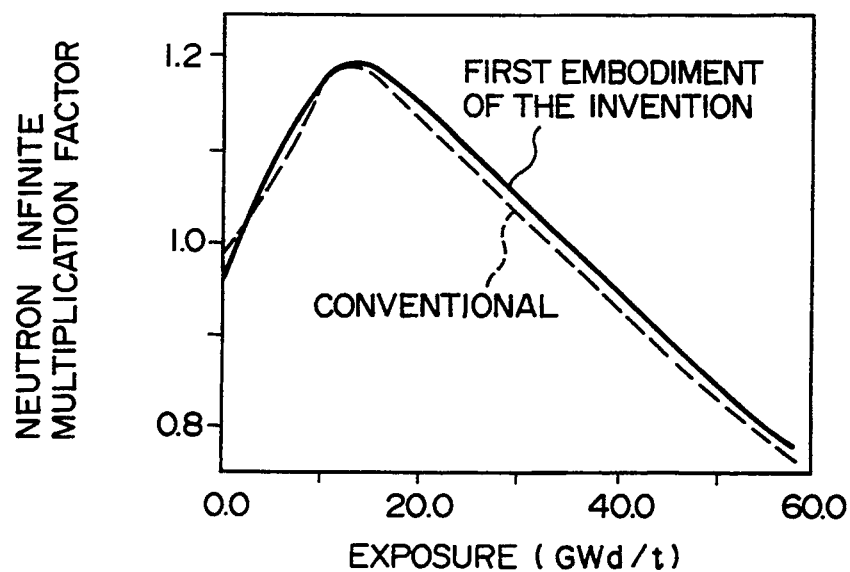
FIG. 6 is a burning characteristic view of neutron infinite multiplication factor of a fuel assembly showing the effect of the embodiment of FIG. 1.

In FIG. 6, changes of neutron infinite multiplication factor with burnup in the fuel assembly according to the first embodiment is shown in contrast to a conventional fuel assembly using only gadolinia as a burnable poison. In the fuel assembly of the first embodiment, burning reactivity characteristics of almost the same level as that of the conventional fuel assembly can be obtained in the initial period of fuel lifetime, and such neutron absorbing material as $^{156}$Gd and $^{158}$Gd can be reduced at the final stage of operation cycle. Furthermore, the average enrichment can be increased by about 0.1 wt. %, and thus the neutron infinite multiplication factor can be increased by about 1.5% Δk. In other words, in the first embodiment, the neutron infinite multification factor can be increased while keeping the maximum uranium enrichment below the upper limit.

In the boiling water-type nuclear reactor, a control rod having a cross-type cross-section is inserted in a gap region formed among the fuel assemblies. Boron is added to the fuel rods provided at the positions facing the gap regions, into which the control rod is not to be inserted, in the outermost peripheral regions of fuel assemblies and no boron is added or boron may be added at a lower concentration, to the fuel rods at the positions facing the gap regions, into which the control rod is to be inserted. In this embodiment, the neutron flux in the regions, into which the control rod is to be inserted, is larger, as compared with the first embodiment, and thus the control rod reactivity can be increased.

Figure 7:
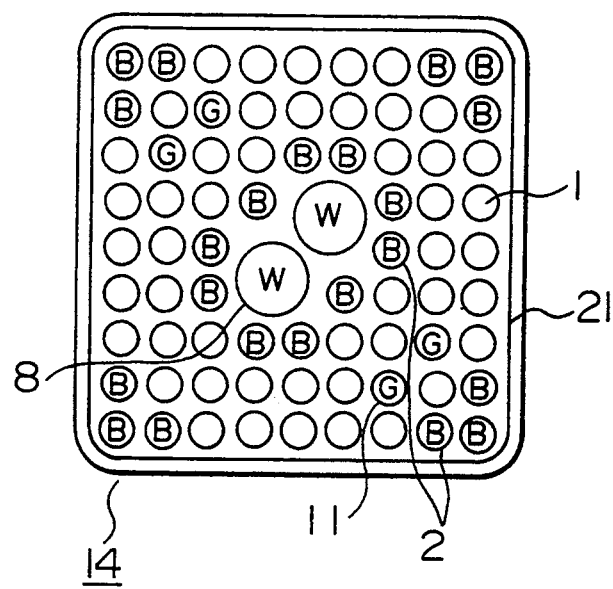
FIG. 7 is a horizontal cross-sectional view of a fuel assembly according to another embodiment of the present invention.

In FIG. 7, the horizontal cross-section of a fuel assembly according to another embodiment of the present invention, when applied to a boiling water-type nuclear reactor, is shown. In this embodiment boron is added to fuel rods 2 around water rods 8 (for example, fuel rods adjacent to the water rods) in addition to the fuel rods at the corners in the outermost peripheral regions of a fuel assembly 14. Similar effect is that of the first embodiment can be obtained in the structure of this embodiment.

In the embodiment shown in FIG. 7, solid moderator rods of zirconium hydride, etc. having an equivalent neutron moderating effect to that of water can be provided in place of the water rods 8 and boron-containing fuel rods 2 may be provided around the solid moderator rods.

Figure 8:
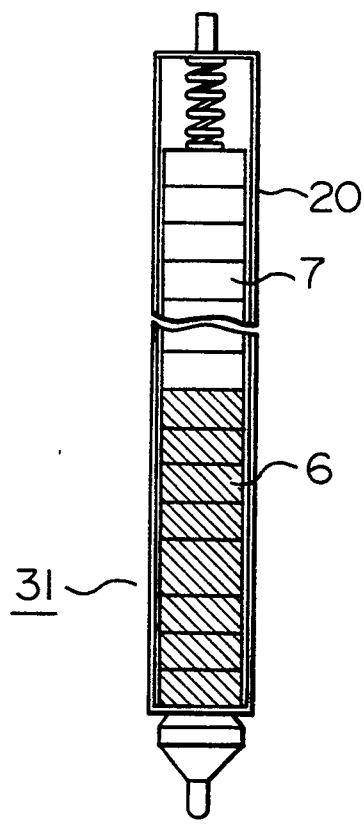
FIG. 8 is a vertical cross-sectional view of a fuel rod according to other embodiment of the present invention.

In FIG. 8, a further embodiment of the present invention where the present invention is applied to a fuel rod 31 is shown. Boron is added to pellets in the lower level section 6 of a fuel rod 20 having a low void coefficient and a large thermal neutron flux, whereas gadolinia is added to pellets in the upper level section 7 of the fuel rod 20. The burnup at which the burnable poison is burnt out can be retarded, as compared with a fuel rod where gadolinia is uniformly added in the axial direction, and it is easier to control the excessive reactivity in case of obtaining higher burnup.

According to other embodiment of the present invention a reactor core charged with the present fuel assemblies can reduce the amount of gadolinia to be added and consequently can reduce the neutron absorption by the remaining gadolinia and correspondingly reduce the amount of fissile material, e.g. $^{235}$U, as compared with a reactor core charged with the conventional fuel assemblies.

In the foregoing embodiments, gadolinium and boron are used as a combination of a burnable absorber having a relatively large thermal neutron absorption cross-section and a burnable absorber having a relatively small thermal neutron cross-section. Other combinations of gadolinium and erbium, gadolinium and dysprosium, gadolinium and a transuranium element such as neptium, americium, etc. can be used in the present invention.

In the foregoing embodiments, enriched uranium oxides are used as fuel, zircaloy is used as a structural material for the reactor core, and water is used as a moderator and a coolant. Other fuel, structural material, moderator and coolant can be used in the present invention.

According to the present fuel assembly, local power peak can be decreased throughout the operation cycle and the reactivity loss by strong neutron absorber can be reduced while keeping the enrichment of fissile material of the fuel uniform.

What is claimed is:

1. A fuel assembly comprising a plurality of first fuel rods containing a nuclear fuel material free from a burnable poison and a plurality of second fuel rods containing the nuclear fuel material and the burnable poison, the plurality of the second fuel rods including (A) a plurality of second fuel rods containing a first burnable poison, located at positions in an outermost row in a cross-section of the fuel assembly, and (B) a plurality of second fuel rods containing a second burnable poison having a larger thermal neutron absorption cross-section than a thermal neutron absorption cross-section of the first burnable poison, located at positions in an inner region of the cross-section of the fuel assembly other than the outermost row.

2. A fuel assembly according to claim 1, wherein (A) the second fuel rods containing the first burnable poison are located at corners in the outermost row.

3. A fuel assembly according to claim 15, wherein the first burnable poison is boron and the second burnable poison is gadolinium.

4. A nuclear reactor core, comprising a plurality of fuel assemblies, at least one of the fuel assemblies including a plurality of first fuel rods containing a nuclear fuel material free from a burnable poison and a plurality of second fuel rods containing the nuclear fuel material and the burnable poison, the plurality of the second fuel rods comprising (A) a plurality of second fuel rods containing a first burnable poison, located at positions in an outermost row in a cross-section of the fuel assembly, and (B) a plurality of second fuel rods containing a second burnable poison having a larger thermal neutron absorption cross-section than a thermal neutron absorption cross-section of the first burnable poison, located at positions in an inner region of the cross-section of the fuel assembly other than the outermost row.

5. A nuclear reactor core according to claim 4, wherein (A) the second fuel rods containing the first burnable poison are located at corners in the outermost row.

6. A nuclear reactor core according to claim 4, wherein the first burnable poison is boron and the second burnable poison is gadolinium.

* * * * *